United States Patent [19]
Klotz et al.

[11] Patent Number: 6,112,515
[45] Date of Patent: Sep. 5, 2000

[54] DEVICE AND PROCESS FOR FASTENING AN INJECTION ELEMENT IN THE INJECTION HEAD OF A ROCKET ENGINE

[75] Inventors: Hans-Joachim Klotz, Hörlkofen; Bernhard Stahn, Ebenhausen; Rüdiger Ewald, Beilngries, all of Germany

[73] Assignee: DaimlerChrysler Aerospace AG, Ottobrunn, Germany

[21] Appl. No.: 09/016,484

[22] Filed: Jan. 30, 1998

[30] Foreign Application Priority Data

Jan. 31, 1997 [DE] Germany ............... 197 03 630

[51] Int. Cl.[7] ........................... F02K 9/52
[52] U.S. Cl. .......................... 60/258; 29/890.01
[58] Field of Search ............ 60/257, 258, 740; 29/890.01

[56] References Cited

U.S. PATENT DOCUMENTS

| | | | |
|---|---|---|---|
| 3,085,394 | 4/1963 | Handley | 60/258 |
| 3,270,499 | 9/1966 | Escher | 60/258 |
| 5,456,065 | 10/1995 | Dargies | 60/258 |

FOREIGN PATENT DOCUMENTS

| | | |
|---|---|---|
| 34 24 225 C2 | 11/1987 | Germany. |
| 38 27 067 C2 | 5/1990 | Germany. |

*Primary Examiner*—Louis J. Casaregola
*Attorney, Agent, or Firm*—McGlew and Tuttle, P.C.

[57] ABSTRACT

A device for fastening an injection element 4 with its foot 5 in a hole of a base plate 1 of an injection head 2 of a rocket engine, the foot 5 is tapered in steps up to its end. A first shoulder 7 of the foot abuts against the base plate 1; a thread (6) screwed into the base plate 1 is present after the first shoulder 7; the thread 6 is followed by a second shoulder 8 and then by a first, smooth cylindrical piece 9. This is followed by a third shoulder 11, on which a solder ring 12 made of a gold alloy is seated. A second, smooth cylindrical piece 13, which has a solder gap 13a between it and the corresponding hole in the base plate 1, follows after the third shoulder 11 up to the end. A process for fastening the injection element 4 provides for the solder ring 12 being first placed on the third shoulder 11, after which the injection element 4 is screwed into the base plate by means of a hexagon 22, and the injection head 2 is subsequently heated to about 1,035° C. under vacuum, while the solder ring 12 penetrates into the solder gap 13a.

20 Claims, 1 Drawing Sheet

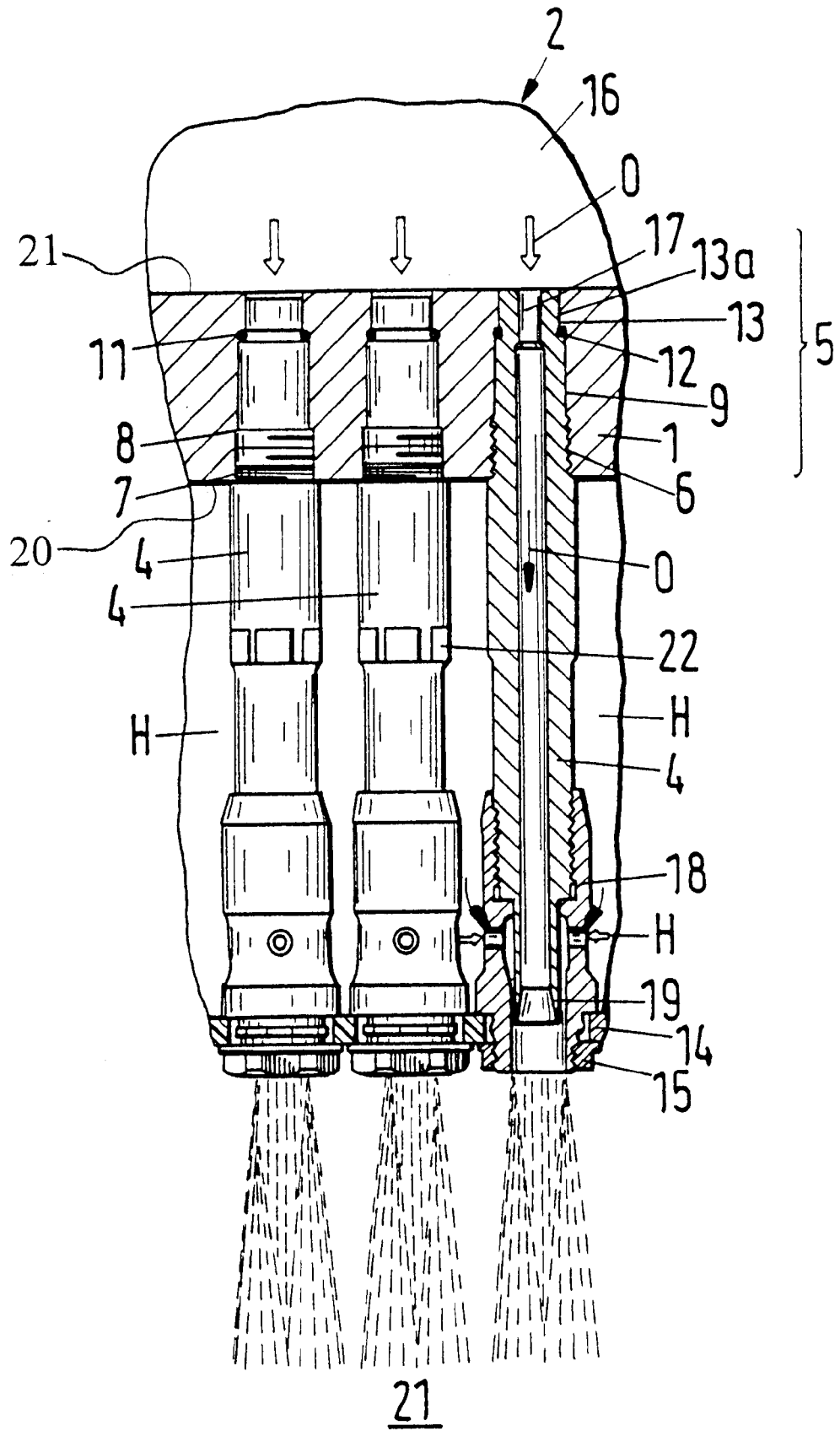

DEVICE AND PROCESS FOR FASTENING AN INJECTION ELEMENT IN THE INJECTION HEAD OF A ROCKET ENGINE

FIELD OF THE INVENTION

The present invention pertains to a device and a process for fastening an injection element in the hole of a base plate of an injection head of a rocket engine.

BACKGROUND OF THE INVENTION

It has been known from DE 34 24 225 C2 that the foot of the injection element can be fastened in the injection head by diffusion welding. A very accurate snug fit of the foot and a surface-compacted hole in the injection head are necessary for preparing for the diffusion welding. Furthermore, an intermediate layer that is accurate to size must be applied on the external diameter of the foot. These preparatory operations require a highly accurate and time-consuming and expensive manufacture. DE 38 27 067 C2 describes an injection head, in which the injection elements are fastened only by soldering or bonding. Four solder depots, which are arranged at spaced locations one behind the other between the foot of the injection element and the hole in the front wall of the injection head, are provided there to achieve the required sealing and strength. Pure soldered and bonded joints represent an increased risk because of the high requirements imposed in terms of strength and tightness under operating conditions (thermal shock, vibrations of the element) and require extensive proof of quality and testing.

SUMMARY AND OBJECTS OF THE INVENTION

The primary object of the present invention is to provide a device and a process of the above-described type, with which a mechanically absolutely reliable and additionally hydraulically tight fastening is guaranteed by means of an economical manufacture.

According to the invention, a device is provided for fastening an injection element with its foot in a hole of a base plate of an injection head of a rocket engine. The foot is fittingly inserted into the hole of the base plate such that a first shoulder abuts against the base plate. A thread screwed into the base plate is present after the first shoulder. A second shoulder, on which a solder ring is placed, is provided after the thread and after an optionally present shoulder joined by a smooth cylindrical piece. A smooth cylindrical piece is present after the second shoulder up to the end.

A solder gap or a solder fillet may be provided between the smooth cylindrical piece and the corresponding hole in the base plate.

At least one of the injection element and the base plate may substantially consist of Inconel 718 or an equivalent material. The solder ring may consist of a gold alloy or an equivalent material.

The invention further provides a process for fastening the injection element wherein the solder ring is first placed on the second shoulder, after which the injection element is screwed firmly into the base plate by means of a hexagon, and the injection head is subsequently heated to about 1,035° C. in a vacuum oven, while the solder ring penetrates into the solder gap.

The essential advantage of the present invention is that the design of the foot of the injection element makes it possible to optimally secure the injection element in every respect. The injection element is secured in terms of strength due to the screw connection to the base plate, because all mechanical loads are transmitted into the base plate via the thread. This leads to simplified design calculations and demonstration of quality. The injection element is hydraulically sealed absolutely reliably by the solder ring, which is heated to about 1,035° C. in the vacuum oven and also fills the solder gap. The geometric orientation of the solder gap is selected to be such that it is not loaded in terms of strength. The far less expensive manufacture of the individual components compared with the prior-art arrangements of injection elements may be mentioned as another, important advantage, because the design according to the present invention allows greater tolerances and no coating is necessary. This also leads to a marked shortening of the integration and process times.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a partial sectional view which shows three injection elements and the fastening of their feet in a base plate of an injection head, wherein one injection element is shown entirely in a sectional view.

DESCRIPTION OF THE PREFERRED EMBODIMENT

Referring to the drawings in particular, three identical injection elements 4 with their feet 5 tapering up to the end are screwed with a thread 6 into a base plate 1 of an injection head 2. The base plate 1 has an injector side 20 and an opposite side 21. A first or injector side shoulder 7 of the feet 5 presses the base plate 1. The thread 6 is followed by a second or middle shoulder 8, which is followed by a first smooth cylindrical piece 9. A third or opposite side shoulder 11, on which a solder ring 12 is placed, is present at the end of the first smooth cylindrical piece 9. A second smooth cylindrical piece 13, which has a length of about 6 mm and leaves a solder gap 13a open in relation to the corresponding hole of the base plate 1, follows after the third shoulder 11 up to the end of the foot 5. The injection elements 4 are inserted at the bottom into a front plate 14 of the injection head 1 and are fastened with nuts 15.

The function becomes apparent from the sectional view of the injection element 4 on the right. Liquid oxygen O enters into a hole 17 of the injection element 4 from an oxygen reservoir 16 and is mixed at the lower end with liquid hydrogen H entering through a sleeve 18. The mixture of O and H is then sprayed under pressure in a nozzle 19 and is burned in a combustion chamber 21.

The process of fastening the injection element 4 is carried out as follows. Before screwing into the base plate 1 by means of the thread 6, the solder ring 12 is placed on the third shoulder 11 of the foot 5. The screwing in is performed by means of a hexagon 22 at the outer circumference of the injection element 4. To distribute the solder ring 12 consisting of a gold alloy in the solder gap 13, the injection head 2 is heated to about 1,035° C. under vacuum. The injection elements are firmly and tightly integrated in the injection head 2 after cooling.

While a specific embodiment of the invention has been shown and described in detail to illustrate the application of the principles of the invention, it will be understood that the invention may be embodied otherwise without departing from such principles.

What is claimed is:

1. A rocket engine fastening arrangement, comprising:
   a base plate of an injection head of the rocket engine, said base plate having an injector side and an opposite side, said base plate defining a hole;
   an injection element with an injection element foot in said hole of said base plate, said injection element foot including an injector side shoulder and an opposite side shoulder, said foot being fittingly inserted into said hole of said base plate such that said injector side shoulder abuts against said injector side of said base plate, said injection element foot including a thread screwed into said base plate at a location between said injector side shoulder and said opposite side shoulder, said opposite side shoulder being joined by a smooth cylindrical piece extending from said opposite side shoulder and up to an end of said injection element foot; and
   a solder ring provided adjacent to said opposite side shoulder.

2. The fastening arrangement in accordance with claim 1, wherein a solder gap or a solder fillet is present between said smooth cylindrical piece after said opposite side shoulder and a corresponding portion of said hole in said base plate.

3. The fastening arrangement in accordance with claim 1 wherein said injection element and/or said base plate are formed of Inconel 718 or an equivalent material.

4. The fastening arrangement in accordance with claim 1, wherein said solder ring is formed of a gold alloy or an equivalent material.

5. The fastening arrangement in accordance with claim 1, further comprising:
   a middle shoulder positioned between said injector side shoulder and said opposite side shoulder;
   another smooth cylindrical piece arranged between said middle shoulder and said opposite side shoulder.

6. The fastening arrangement in accordance with claim 1, wherein:
   said solder ring solders said injection element to said base plate.

7. A rocket engine fastening arrangement, comprising:
   a base plate of an injection head of the rocket engine, said base plate having an injector side and an opposite side, said base plate defining a hole;
   an injection element with an injection element foot arranged in said hole of said base plate, said injection element foot including an injector side shoulder and an opposite side shoulder, said foot being arranged in said hole of said base plate such that said injector side shoulder abuts against said injector side of said base plate, said injection element foot including a thread screwed into said base plate, said thread being arranged between said injector side shoulder and said opposite side shoulder, said injection element foot includes a first smooth cylindrical piece between said thread and said opposite side shoulder, said injection element toot includes a second smooth cylindrical piece between said opposite side shoulder and said opposite side of said base plate;
   a solder ring arranged on said opposite side shoulder soldering said injection element to said base plate.

8. The fastening arrangement in accordance with claim 7, wherein a solder gap or a solder fillet is present between said smooth cylindrical piece after said opposite side shoulder and a corresponding hole portion in said base plate.

9. The fastening arrangement in accordance with claim 8 wherein said injection element and/or said base plate are formed of Inconel 718 or an equivalent material.

10. The fastening arrangement in accordance with claim 7, wherein said solder ring is formed of a gold alloy or an equivalent material.

11. The fastening arrangement in accordance with claim 9, wherein said solder ring is formed of a gold alloy or an equivalent material.

12. The fastening arrangement in accordance with claim 7, wherein:
    said hole in said base plate and said second cylindrical piece define a solder gap or a solder fillet.

13. The fastening arrangement in accordance with claim 7, wherein:
    said injection element and/or said base plate are formed of Inconel 718.

14. The fastening arrangement in accordance with claim 7, wherein;
    said solder ring is formed of a gold alloy.

15. The fastening arrangement in accordance with claim 7, wherein;
    said opposite side of said base plate is positioned adjacent a reservoir of the rocket engine.

16. The fastening arrangement in accordance with claim 7, further comprising:
    a middle shoulder positioned between said injector side shoulder and said opposite side shoulder, said first smooth cylindrical piece being arranged between said middle shoulder and said opposite side shoulder.

17. A process for fastening an injection element, the process comprising the steps of:
    providing a base plate of an injection head of a rocket engine, said base plate having an injector side and an opposite side, said base plate defining a hole;
    providing an injection element with an injection element foot in said hole of said base plate, said injection element foot including an injection side shoulder and an opposite side shoulder;
    providing a solder ring;
    placing said solder ring on said opposite side shoulder;
    screwing said injection element with said soldering ring into said base plate;
    soldering said injection element to said base plate with said soldering ring.

18. The process in accordance with claim 17, wherein:
    said soldering includes heating the injection head to approx. 1,035° C. in a vacuum oven.

19. The process in accordance with claim 14, wherein:
    said hole in said base plate and said injection element foot define a solder gap;
    said soldering includes heating the injection head to approx. 1,035° C. in a vacuum oven to cause the solder ring to penetrate into the solder gap.

20. The process in accordance with claim 17, wherein:
    said screwing is by means of a heaxagon.

* * * * *